US012785893B2

(12) United States Patent
Mei et al.

(10) Patent No.: US 12,785,893 B2
(45) Date of Patent: Nov. 3, 2026

(54) INDICATION OF DEMODULATION REFERENCE SIGNAL (DMRS) AND PHASE TRACKING REFERENCE SIGNAL (PTRS) ASSOCIATION

(71) Applicant: ZTE Corporation, Shenzhen (CN)

(72) Inventors: Meng Mei, Shenzhen (CN); Bo Gao, Shenzhen (CN); Zhaohua Lu, Shenzhen (CN); Shujuan Zhang, Shenzhen (CN); Ke Yao, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 309 days.

(21) Appl. No.: 18/521,313

(22) Filed: Nov. 28, 2023

(65) Prior Publication Data

US 2024/0129091 A1 Apr. 18, 2024

Related U.S. Application Data

(63) Continuation of application No. PCT/CN2022/090059, filed on Apr. 28, 2022.

(51) Int. Cl.
*H04L 5/00* (2006.01)
*H04W 72/232* (2023.01)

(52) U.S. Cl.
CPC ......... *H04L 5/0051* (2013.01); *H04W 72/232* (2023.01)

(58) Field of Classification Search
CPC ........................... H04W 27/232; H04L 5/0051
See application file for complete search history.

(56) References Cited

U.S. PATENT DOCUMENTS 11,902,909 B2 * 2/2024 Qi ........................ H04B 7/0456
2019/0182001 A1 6/2019 Lee et al.
(Continued)

FOREIGN PATENT DOCUMENTS

CN 110034904 A 7/2019
CN 110351037 A 10/2019
(Continued)

OTHER PUBLICATIONS

Notice of Allowance for Chinese Patent Application No. 202410758731.6, mailed Feb. 4, 2026 (8 pages).
(Continued)

*Primary Examiner* — Zhiren Qin
(74) *Attorney, Agent, or Firm* — Perkins Coie LLP

(57) ABSTRACT

Methods, apparatus, and systems that enable the indication of Demodulation Reference Signal (DMRS) and Phase Tracking Reference Signal (PTRS) for enhancement of the PTRS as well as the DMRS transmissions in future generations of wireless communication systems. In one example aspect, a method for wireless communication includes transmitting, by a base station to a terminal device, a signaling message indicating an association between more than four DMRS ports and at least two PTRS ports. The signaling message includes multiple groups of bits. Each group corresponds to a PTRS port, and each group includes one or more bits indicating a value that corresponds to one of the more than four DMRS ports. The method also includes receiving, by the base station, a transmission from the terminal device according to the signaling message.

16 Claims, 10 Drawing Sheets

(56) References Cited

U.S. PATENT DOCUMENTS

| | | | | |
|---|---|---|---|---|
| 2019/0261279 | A1 | 8/2019 | Qi | |
| 2020/0328768 | A1* | 10/2020 | Hessler | H04L 5/0051 |
| 2020/0336355 | A1* | 10/2020 | Yamada | H04L 27/261 |
| 2020/0412503 | A1* | 12/2020 | Huang | H04L 5/0091 |
| 2020/0413433 | A1* | 12/2020 | Jiang | H04L 1/0072 |
| 2021/0036746 | A1 | 2/2021 | Liu et al. | |
| 2021/0044467 | A1 | 2/2021 | Xi et al. | |
| 2021/0075453 | A1 | 3/2021 | Lee et al. | |
| 2021/0075570 | A1 | 3/2021 | Xi et al. | |
| 2021/0400598 | A1* | 12/2021 | Qi | H04B 7/0456 |
| 2022/0190985 | A1 | 6/2022 | Huang | |
| 2022/0239410 | A1* | 7/2022 | Lim | H04W 72/0446 |
| 2023/0076789 | A1* | 3/2023 | Oteri | H04L 27/2613 |
| 2025/0048358 | A1* | 2/2025 | Liu | H04L 5/0051 |
| 2025/0141627 | A1* | 5/2025 | Shabara | H04L 5/0051 |
| 2025/0219785 | A1* | 7/2025 | Gao | H04L 5/0051 |
| 2025/0286669 | A1* | 9/2025 | Xiao | H04L 1/189 |

FOREIGN PATENT DOCUMENTS

| | | | |
|---|---|---|---|
| CN | 110463099 | A | 11/2019 |
| CN | 112106315 | A | 12/2020 |
| JP | 2020-509617 | A | 3/2020 |
| WO | 2019/112374 | A1 | 6/2019 |
| WO | 2019159568 | A1 | 8/2019 |
| WO | 2021168597 | A1 | 9/2021 |
| WO | 2023/007670 | A1 | 2/2023 |

OTHER PUBLICATIONS

Communication pursuant to Article 94(3) EPC for European Patent Application No. 22 939 137.0, mailed Mar. 4, 2026 (9 pages).
Ericsson, "Remaining issues on PDCCH, PUSCH and PUCCH enhancements for multi-TRP," 3GPP TSG-RAN WG1 Meeting #106bis-e, R1-2110289, eMeeting, Oct. 11-19, 2021 (20 pages).
Office Action for Korean Patent Application No. 10-2023-7039279, mailed Dec. 24, 2025, with English summary (8 pages).
International Search Report and Written Opinion for International Application No. PCT/CN2022/090059, mailed on Nov. 28, 2022 (9 pages).
Huawei, "Introduction of MR DC/CA," 3GPP TSG RAN WG1 #99, Reno, USA, R1-1913665, Nov. 18-22, 2019, 23 pages.
Extended European Search Report for European Patent Application No. 22939137.0, mailed Dec. 2, 2024 (8 pages).
Lenovo et al., "Remaining issues on PTRS," 3GPP TSG RAN WG1 Meeting #92bis, R1-1804199, Sanya, China, Apr. 16-20, 2018 (4 pages).
Lg Electronics, "Text proposals on UL PT-RS power boosting and DL PT-RS reception," 3GPP TSG RAN WG1 Meeting AH 1801, R1-1800369, Vancouver, Canada, Jan. 22-26, 2018 (8 pages).
Office Action for Japanese Patent Application No. 2023-571568, mailed Dec. 16, 2024 (11 pages).
CATT, "Correction on PTRS for UL full powertransmission," 3GPP TSG RAN WG1 #103-e, R1-2007819, e-Meeting, Oct. 26-Nov. 13, 2020 (5 pages).
Office Action for Chinese Patent Application No. 2024107587316, mailed Sep. 13, 2025 (13 pages).
First Examination Report for Australian Patent Application No. 2022454927, mailed Aug. 22, 2024 (2 pages).
Notice of Acceptance for Australian Patent Application No. 2022454927, mailed Sep. 23, 2024 (3 pages).
Notice of Allowance for Japanese Patent Application No. 2023-571568, mailed May 7, 2025 (4 pages).
Communication pursuant to Article 94(3) EPC for European Patent Application No. 22939137.0, mailed Jul. 31, 2025 (8 pages).
Apple Inc., "Remaining Issues on Multi-TRP Enhancement," 3GPP TSG RAN WG1 #99, R1-1912823, Reno, USA, Nov. 18-22, 2019 (10 pages).
Samsung, "Enhancements on Multi-TRP for PDCCH, PUCCH and PUSCH," 3GPP TSG RAN WG1 #106b-e, R1-2109469, e-Meeting, Oct. 11-19, 2021 (15 pages).
Spreadtrum Communications, "Discussion on enhancements on HST-SFN deployment," 3GPP TSG RAN WG1 #105-e, R1-2104414, e-Meeting, May 10-27, 2021 (7 pages).
Intel Corporation, "Multi-TRP enhancements for PUCCH and PUSCH," 3GPP TSG RAN WG1 #105-e, R1-2104889, e-Meeting, May 10-27, 2021 (5 pages).
Ericsson, "Summary of PTRS issues and way forwards," 3GPP TSG-RAN WG1 Meeting #88bis, R1-1706598, Spokane, U.S., Apr. 3-7, 2017 (4 pages).
Xinwei, "Evaluation and Discussion on DL Phase Tracking RS Design," 3GPP TSG-RAN WG1 #89, R1-1707088, Hangzhou, China, May 15-19, 2017 (5 pages).

* cited by examiner

300

400

500

600

INDICATION OF DEMODULATION REFERENCE SIGNAL (DMRS) AND PHASE TRACKING REFERENCE SIGNAL (PTRS) ASSOCIATION

CROSS REFERENCE TO RELATED APPLICATIONS

This patent document is a continuation of and claims benefit of priority to International Patent Application No. PCT/CN2022/090059, filed on Apr. 28, 2022. The entire content of the before-mentioned patent application is incorporated by reference as part of the disclosure of this application.

TECHNICAL FIELD

This patent document is directed to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable the indication of Demodulation Reference Signal (DMRS) and Phase Tracking Reference Signal (PTRS) for enhancement of the PTRS as well as the DMRS transmissions in future generations of wireless communication systems.

In one example aspect, a method for wireless communication includes transmitting, by a base station to a terminal device, a signaling message indicating an association between more than four DMRS ports and at least two PTRS ports. The signaling message includes multiple groups of bits. Each group corresponds to a PTRS port, and each group includes one or more bits indicating a value that corresponds to one of the more than four DMRS ports. The method also includes receiving, by the base station, a transmission from the terminal device according to the signaling message.

In another example aspect, a method for wireless communication includes receiving, by a terminal device from a base station, a signaling message indicating an association between more than four DMRS ports and at least two PTRS ports. The signaling message includes multiple groups of bits. Each group corresponds to a PTRS port, and each group includes one or more bits indicating a value that corresponds to one of the more than four DMRS ports. The method also includes performing, by the terminal device, a transmission to the base station according to the signaling message.

In another example aspect, a method for wireless communication includes transmitting, by a base station to a terminal device, a signaling message that includes at least three bits indicating an association between more than four DMRS ports and a single PTRS port. The method also includes receiving, by the base station, a transmission from the terminal device according to the signaling message.

In another example aspect, a method for wireless communication includes receiving, by a terminal device from a base station, a signaling message that includes at least three bits indicating an association between more than four DMRS ports and a single PTRS port. The method also includes performing, by the terminal device, a transmission to the base station according to the signaling message.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

In wireless communication systems, the phase noise of a transmitter increases as the frequency of operation increases. The Phase Tracking Reference Signal (PTRS) can be used for phase noise estimation and compensation for Demodulation Reference Signal (DMRS) estimation. Therefore, a PTRS port can be associated with a DMRS port in transmissions. Currently in the New Radio (NR) communication systems, one User Equipment (UE) can support up to four DMRS ports and up to two PTRS ports. In the Downlink Control Information (DCI) signaling, two bits are used for the PTRS-DMRS association. In some cases, one PTRS port is supported. Two bits are used to indicated which one of the up to four DMRS ports is associated with the PTRS port. In some cases, two PTRS ports are supported and two DMRS ports share one PTRS port respectively. Two bits are used to indicate the association of the DMRS ports and the two PTRS port: the first bit is used to indicate which DMRS port is associated with PTRS port 0 and the second bit is used to indicated which DMRS port is associated with PTRS port 1. The DMRS port corresponds to one SRS resource indicator (SRI) field and/or precoding information and number of layers field. In some cases, two SRS resource indicator fields and/or precoding information and number of layers fields are supported, and each bit is used for PTRS-DMRS association of the corresponding SRS resource indicator field and/or precoding information and number of layers field.

The advancement of the wireless technology requires more use of higher frequency bands and demands enhancement of the DMRS/PTRS design in future generations of the communication systems. This patent document discloses techniques that enable future enhancement of the DMRS-PTRS design. In particular, the disclosed techniques can be used to support more than four DMRS ports and the association with two or more PTRS ports. The discloses techniques can also be used to determine the resource element mapping and power control of the PTRS transmission.

Figure 1A:
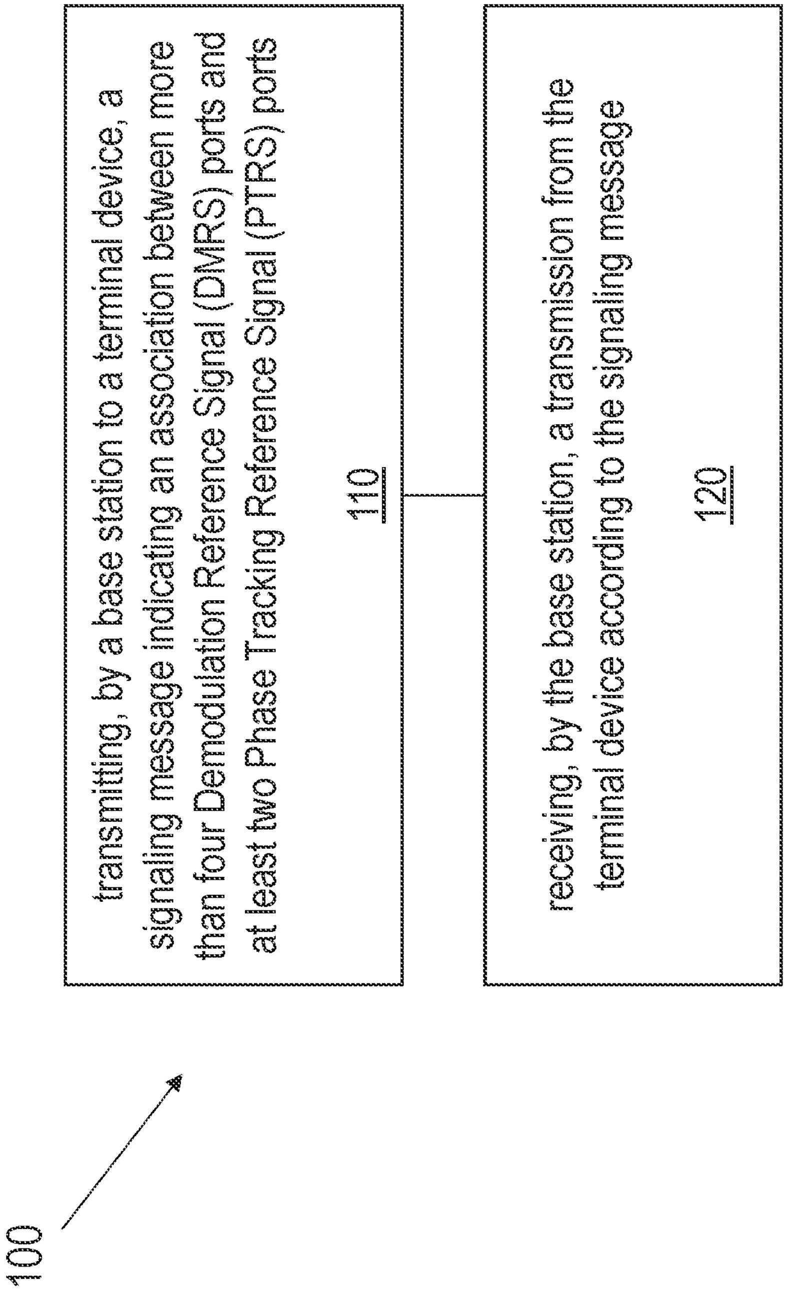
FIG. 1A is a flowchart representation of a method for wireless communication in accordance with one or more embodiments of the present technology.

FIG. 1A is a flowchart representation of a method 100 for wireless communication in accordance with one or more embodiments of the present technology. The method 100 includes, at operation 110, transmitting, by a base station to a terminal device, a signaling message indicating an association between more than four DMRS ports and at least two PTRS ports. The signaling message includes multiple groups of bits. Each group corresponds to a PTRS port, and each group includes one or more bits indicating a value that corresponds to one of the more than four DMRS ports. The method 100 also includes, at operation 120, receiving, by the base station, a transmission from the terminal device according to the signaling message.

Figure 1B:
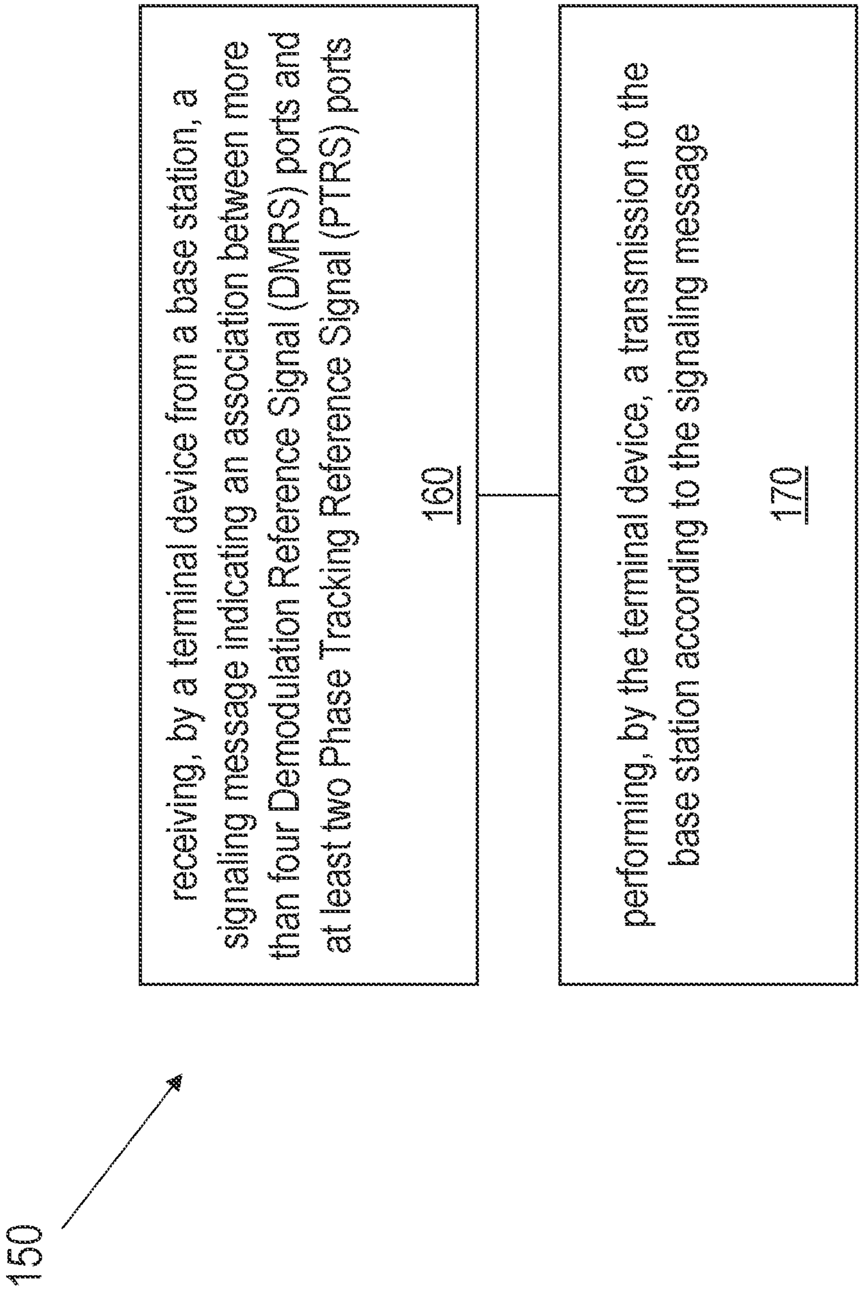
FIG. 1B is a flowchart representation of another method for wireless communication in accordance with one or more embodiments of the present technology.

FIG. 1B is a flowchart representation of a method 150 for wireless communication in accordance with one or more embodiments of the present technology. The method 150 includes, at operation 160, receiving, by a terminal device from a base station, a signaling message indicating an association between more than four DMRS ports and at least two PTRS ports. The signaling message includes multiple groups of bits. Each group corresponds to a PTRS port, and each group includes one or more bits indicating a value that corresponds to one of the more than four DMRS ports. The method 150 also includes, at operation 170, performing, by the terminal device, a transmission to the base station according to the signaling message.

In some embodiments, the signaling message include two groups of bits. Each group include at least one of: (1) two bits that indicate the association between one PTRS port and one DMRS port from up to 4 DMRS ports that share the one PTRS port; or (2) one bit that indicates the association between one PTRS port and one DMRS port from first two DMRS ports that share the one PTRS port. In some embodiments, the signaling message include four groups of bits. Each group include one bit to indicate the association between one PTRS port and one DMRS port from up to two DMRS ports that share the one PTRS port.

In some embodiments, the signaling message is indicated for a transmission from the terminal device to the base station. The transmission comprises at least one of a partial coherent codebook-based transmission, a non-coherent codebook-based transmission, and/or a non-codebook based-transmission.

Figure 2A:
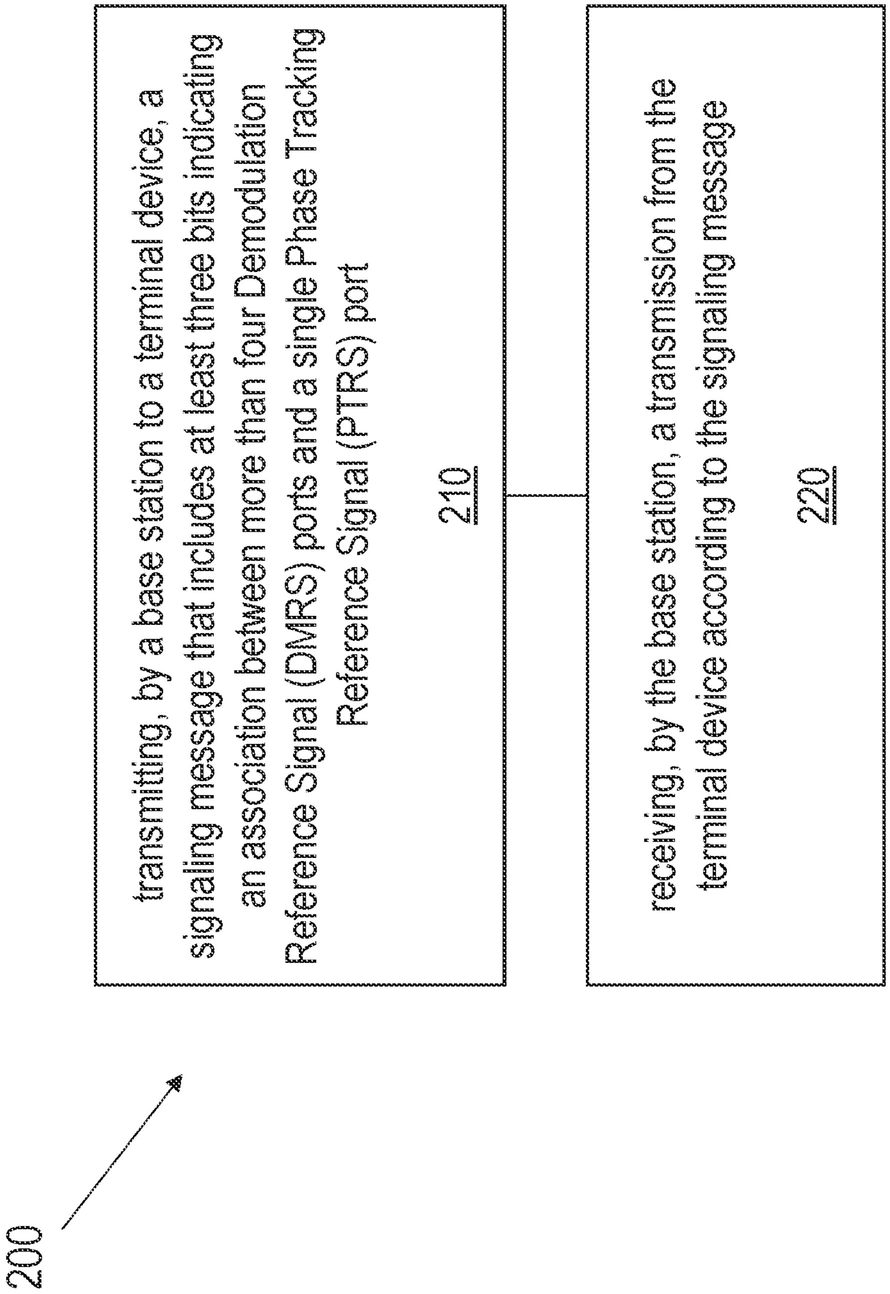
FIG. 2A is a flowchart representation of another method for wireless communication in accordance with one or more embodiments of the present technology.

FIG. 2A is a flowchart representation of a method 200 for wireless communication in accordance with one or more embodiments of the present technology. The method 200 includes, at operation 210, transmitting, by a base station to a terminal device, a signaling message that includes at least three bits indicating an association between more than four DMRS ports and a single PTRS port. The method 200 also includes, at operation 220, receiving, by the base station, a transmission from the terminal device according to the signaling message.

Figure 2B:
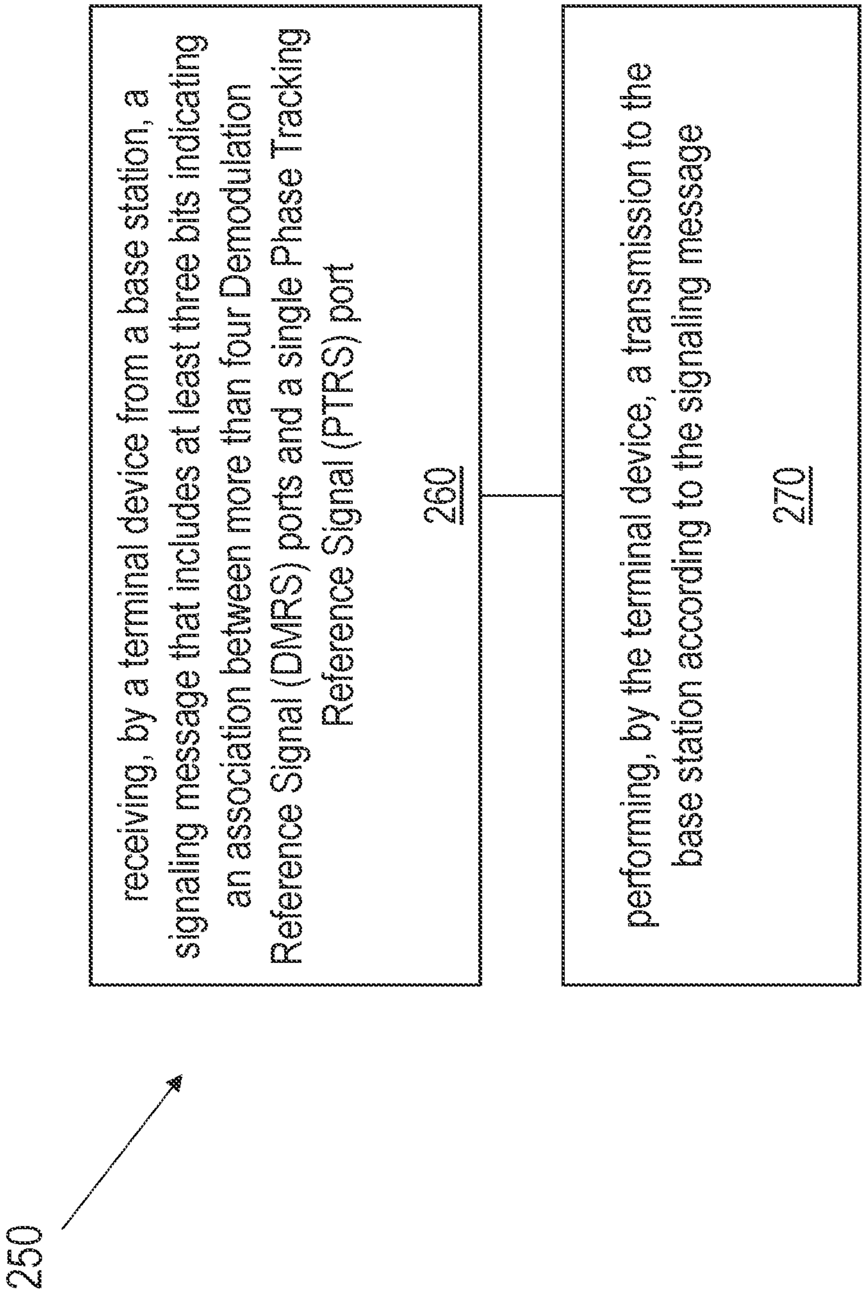
FIG. 2B is a flowchart representation of yet another method for wireless communication in accordance with one or more embodiments of the present technology.

FIG. 2B is a flowchart representation of a method 250 for wireless communication in accordance with one or more embodiments of the present technology. The method 250 includes, at operation 260, receiving, by a terminal device from a base station, a signaling message that includes at least three bits indicating an association between more than four DMRS ports and a single PTRS port. The method 250 also includes, at operation 270, performing, by the terminal device, a transmission to the base station according to the signaling message.

In some embodiments, the signaling message is indicated for a transmission from the terminal device to the base station. The transmission comprises at least one of a full coherent codebook-based transmission and/or a non-codebook-based transmission.

Some examples of the disclosed techniques are further described below.

Embodiment 1

In codebook-based UL transmissions, three schemes are supported: full-coherent transmissions, partial coherent transmissions, and non-coherent transmissions. In this embodiment, it is assumed that eight or more DMRS and two TPRS ports are supported. The UE can receive an indication in the DCI signaling for uplink (UL) transmission to indicate the DMRS ports associated with PTRS port(s). The indication includes at least three bits.

For full-coherent UL transmission and/or non-codebook-based transmissions with Sounding Resource Signal (SRS) resource or resource sets configured with the same PTRS port, the configured DMRS ports share the same PTRS port if PTRS port is configured. Only the configured DMRS port(s) needs to be signaled as the PTRS port is implicitly indicated. For example, for full-coherent UL transmissions, Table 1 illustrates an example indication of the association between the DMRS ports and the configured PTRS port in accordance with one or more embodiments of the present technology. If eight DMRS ports are supported, three bits can be used to indicate the association between each DRMS port and the PTRS port. Additional bits can be used to support more than eight DMRS ports.

TABLE 1

Example DMRS-TPRS Indication

| Value | DMRS port |
|---|---|
| 0 | $1^{st}$ scheduled DMRS port |
| 1 | $2^{nd}$ scheduled DMRS port |
| 2 | $3^{rd}$ scheduled DMRS port |
| 3 | $4^{th}$ scheduled DMRS port |
| 4 | $5^{th}$ scheduled DMRS port |
| 5 | $6^{th}$ scheduled DMRS port |
| 6 | $7^{th}$ scheduled DMRS port |
| 7 | $8^{th}$ scheduled DMRS port |
| . . . | . . . |
| N to 15 (N > 7) | Reserved |

For partial coherent and/or non-coherent codebook-based UL transmissions, part of the configured DMRS ports shares one PTRS port. It is thus necessary to indicate which DMRS port(s) share which PTRS port(s). Furthermore, the association between the Sounding Reference Signal (SRS) resource(s)/port(s) and the DMRS port(s) can be indicated in the SRS Resource Indicator (SRI) field and/or Transmit Precoder Matrix Indicator (TPMI). For example, the codebook for UL transmission is indicated by the TPMI field. The codebook can also indicate the association between DMRS port and SRS port. If the association between SRS port and PTRS port is configured, the association between the DMRS ports and the PTRS port can be determined based on the association between DMRS port and SRS port.

Figure 3:
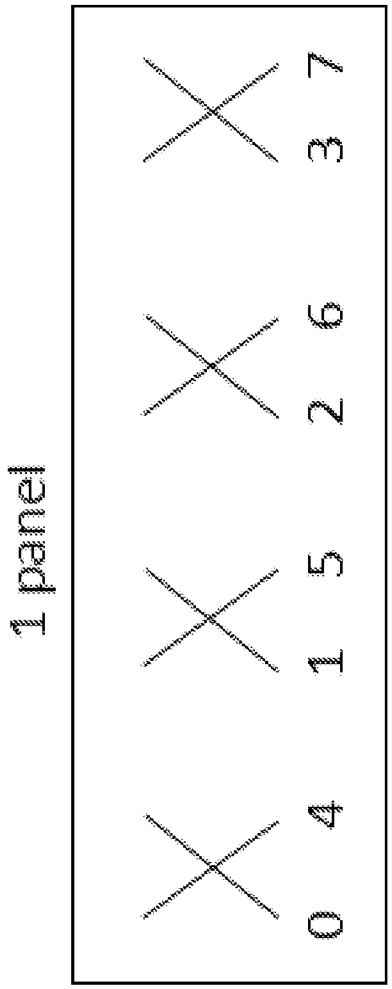
FIG. 3 illustrates an example of transmission ports on an antenna panel in accordance with one or more embodiments of the present technology.

FIG. 3 illustrates an example 300 of transmission ports on an antenna panel in accordance with one or more embodiments of the present technology. As shown in FIG. 3, eight antenna ports are associated with eight SRS ports. Part of the SRS ports/DMRS ports are coherent. For example, SRS ports {0, 4, 1, 5} are coherent with each other and the other SRS ports {2, 6, 3, 7} are coherent with each other. Therefore, SRS ports {0, 4, 1, 5} share PTRS port 0 and SRS ports {2, 6, 3, 7} share PTRS port 1. If the DMRS ports are configured to be associated with the coherent SRS ports, then the DMRS ports share the same PTRS port.

For codebook-based UL transmissions, the TPMI field indicates the UL codebook and the UL transmission layer number. For example, if the codebook indicates the DMRS ports that share the same coherent SRS ports of {0, 4, 1, 5}, it can be determined that the DMRS ports share the same PTRS port 0. In some embodiments, the PTRS-DMRS association can be indicated in a field in the DCI signaling (e.g., the PTRS-DMRS field) to show which DMRS port is associated with the PTRS port 0. As another example, if the codebook indicates the DMRS ports that share the same coherent SRS ports of {2, 6, 3, 7}, it can be determined that the DMRS ports share the same PTRS port 1. The PTRS-DMRS association can be indicated in the DCI signaling (e.g., the PTRS-DMRS field) to show which DMRS port is associated with the PTRS port 1. As yet another example, if the codebook indicates the DMRS ports with different coherent SRS ports, it can be determined that two PTRS ports are supported and the association between the DMRS ports and the two PTRS are indicated respectively.

In some embodiments, the DCI signaling message can include four or more bits to indicate the association between the DMRS ports and the PTRS ports. Assuming that eight DMRS ports are supported, four bits of the DCI signaling message can be divided into two groups. Each group includes two bits to indicate the PTRS-DMRS association with one of the PTRS ports. Table 2 illustrates another example indication of the association between the DMRS port and the PTRS port in accordance with one or more embodiments of the present technology. As shown in Table 2, up to four DMRS ports share one PTRS port and up to 2 PTRS ports are supported. The first two bits in a DCI field (e.g., in the PTRS-DMRS association field) can be used to indicate which DMRS port from the up to four DMRS ports is associated with PTRS port 0, and the other two bits can be used to indicate which DMRS port from the up to four DMRS ports is associated with PTRS port 1.

TABLE 2

Example DMRS-TPRS Indication

| Value of the first 2 bits | DMRS port | Value of the second 2 bits | DMRS port |
|---|---|---|---|
| 0 | 1st scheduled DMRS port which shares PTRS port 0 | 0 | 1st scheduled DMRS port which shares PTRS port 1 |
| 1 | 2nd scheduled DMRS port which shares PTRS port 0 | 1 | 2nd scheduled DMRS port which shares PTRS port 1 |
| 2 | 3rd scheduled DMRS port which shares PTRS port 0 | 2 | 3rd scheduled DMRS port which shares PTRS port 1 |
| 3 | 4th scheduled DMRS port which shares PTRS port 0 | 3 | 4th scheduled DMRS port which shares PTRS port 1 |

Embodiment 2

In this embodiment, it is assumed that eight or more DMRS ports and more than two TPRS ports are supported. The DCI signaling includes three or more bits to indicate the PTRS-DMRS association. In some embodiments, up to 24 DMRS ports can be supported.

For full coherent codebook-based transmissions and/or non-codebook-based transmissions with SRS resource or resource sets configured with the same PTRS port, the configured DMRS ports share the same PTRS port. Table 3 illustrates an example indication of the association between the DMRS port and the configured PTRS port in accordance with one or more embodiments of the present technology. If eight DMRS ports are supported, three bits can be used to indicate the association between each DRMS port and the PTRS port. Additional bits can be used to support more than eight DMRS ports.

TABLE 3

Example DMRS-TPRS Indication

| Value | DMRS port |
|---|---|
| 0 | 1st scheduled DMRS port |
| 1 | 2nd scheduled DMRS port |
| 2 | 3rd scheduled DMRS port |
| 3 | 4th scheduled DMRS port |
| 4 | 5th scheduled DMRS port |
| 5 | 6th scheduled DMRS port |
| 6 | 7th scheduled DMRS port |
| 7 | 8th scheduled DMRS port |
| . . . | . . . |
| N to 15 (N > 7) | Reserved |

For partial coherent/non-coherent codebook-based UL transmissions and/or the non-codebook-based UL transmission with the SRS resource or resource sets configured with the same PTRS port(s), a subset of the configured DMRS ports (e.g., up to two DMRS ports) can share the same PTRS port.

Figure 4:
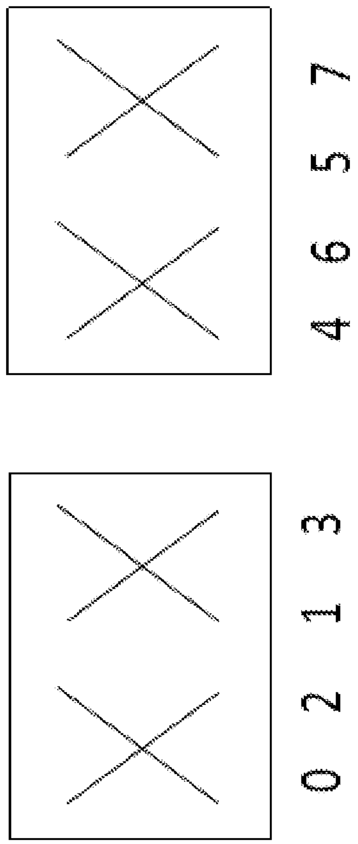
FIG. 4 illustrates an example of transmission ports on two antenna panels in accordance with one or more embodiments of the present technology.
Figure 5:
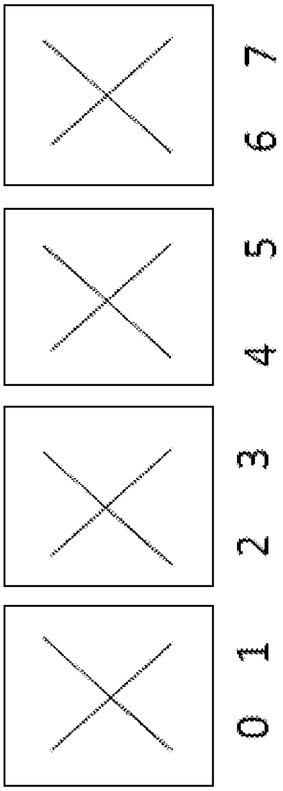
FIG. 5 illustrates an example of transmission ports on four antenna panels in accordance with one or more embodiments of the present technology.

In some embodiments, the association between the DRMS and the PTRS can be determined based on SRS configuration or be explicitly indicated. FIG. 4 illustrates an example 400 of transmission ports on two antenna panels in accordance with one or more embodiments of the present technology. In this example, SRS port 0 and 2 share one PTRS port; SRS port 1 and 3 share one PTRS port; SRS port 4 and 6 share one PTRS port, and SRS port 5 and 7 share one PTRS port. For codebook-based transmissions, when the TPMI field indicates the codebook for the UL transmission, the TPMI field can also indicate which DMRS port(s) share the PTRS port(s). FIG. 5 illustrates an example 500 of transmission ports on four antenna panels in accordance with one or more embodiments of the present technology. For example, each panel includes two antenna ports (e.g., SRS ports) that share one PTRS port, and a total of four PTRS ports are supported. As another example, the antenna ports in two panels share the same PTRS port, and up to two PTRS ports are supported (e.g., SRS port 1, 0, 4, 5 share PTRS port 0 and SRS port 2, 3, 6, 7 share PTRS port 1). The PTRS ports can be indicated to the UE in the UL transmission, and the PTRS-DMRS association can be included in the DCI signaling to indicate which DMRS port(s) share one PTRS port.

In some embodiments, up to four PTRS ports can be supported. Table 4 illustrates an example indication of the association between the DMRS port and the configured PTRS port in accordance with one or more embodiments of the present technology. In this example, the available bits (e.g., four bits) are divided into multiple groups corresponding to the number of supported PTRS ports (e.g., four PTRS ports). Each group includes one or more bits (e.g., one bit) that indicate which DMRS port(s) is associated with the respective PTRS port.

TABLE 4

Example DMRS-TPRS Indication

| $1^{st}$ bit | DMRS port | $2^{nd}$ bit | DMRS port | $3^{rd}$ bit | DMRS port | $4^{th}$ bit | DMRS port |
|---|---|---|---|---|---|---|---|
| 0 | $1^{st}$ DMRS port which shares PTRS port 0 | 0 | $1^{st}$ DMRS port which shares PTRS port 1 | 0 | $1^{st}$ DMRS port which shares PTRS port 2 | 0 | $1^{st}$ DMRS port which shares PTRS port 3 |
| 1 | $2^{nd}$ DMRS port which shares PTRS port 0 | 1 | $2^{nd}$ DMRS port which shares PTRS port 1 | 1 | $2^{nd}$ DMRS port which shares PTRS port 2 | 1 | $2^{nd}$ DMRS port which shares PTRS port 3 |

Embodiment 3

In some embodiments, when more than four DMRS ports are supported, how the PTRS is mapped to the resource elements and/or OFDM symbols depends on the DMRS design.

For full-coherent UL codebook-based transmissions and/or non-bode-book-based transmissions in which the SRS resources are configured to share one PTRS port, the configured DMRS ports share one PTRS port. Take Type-1 DMRS with eight DMRS ports as an example. When the DMRS ports share one PTRS port, the resource elements (REs) on one OFDM symbol can be used to map the PTRS. That is, if the PTRS is configured to be mapped on one Physical Resource Block (PRB), then the REs from #0 to #11 can be available for the PTRS. A parameter can be introduced (e.g., resourceElementOffset) to determine which RE can be mapped to the PTRS. Table 5 shows an example of resourceElementOffset values for different DMRS types and ports. It is noted that, for different DMRS port numbers, the offset values corresponding to the same offset indicator are different to reduce or minimize interference.

TABLE 5

Example parameter $k_{ref}^{RE}$

| | $k_{ref}^{RE}$ | | | | | | | |
|---|---|---|---|---|---|---|---|---|
| DM-RS | DM-RS Configuration type 1 resourceElementOffset | | | | DM-RS Configuration type 2 resourceElementOffset | | | |
| antenna port $\tilde{p}$ | offset 00 | offset 01 | offset 10 | offset 11 | offset 00 | offset 01 | offset 10 | offset 11 |
| 0 | 0 | 2 | 4 | 6 | 0 | 1 | 6 | 7 |
| 1 | 2 | 4 | 6 | 0 | 1 | 6 | 7 | 0 |
| 2 | 1 | 3 | 5 | 7 | 2 | 3 | 8 | 9 |
| 3 | 3 | 5 | 7 | 1 | 3 | 8 | 9 | 2 |
| 4 | 4 | 6 | 0 | 2 | 4 | 5 | 10 | 11 |
| 5 | 6 | 0 | 2 | 1 | 5 | 10 | 11 | 4 |
| 6 | 5 | 7 | 1 | 3 | 6 | 7 | 1 | 0 |
| 7 | 7 | 1 | 3 | 5 | 7 | 1 | 0 | 6 |
| 8 | | | | | 8 | 9 | 2 | 3 |
| 9 | | | | | 9 | 2 | 3 | 8 |
| 10 | | | | | 10 | 11 | 4 | 5 |
| 11 | | | | | 11 | 4 | 5 | 10 |

In some embodiments, which REs are mapped to the PTRS can be configured by the RRC signaling and/or activated by MAC CE. For example, there are 12 REs on one PRB of one OFDM symbol. The RRC signaling can configure the RE index or a set of RE indices in the PRB. In some embodiments, if a set of RCE indices is configured, a MAC CE can be used to activate one or more indices selected from the set. Tables 6-9 show example indications of DMRS ports with DMRS Type-1 for different rank values in accordance with one or more embodiments of the present technology.

TABLE 6

Antenna port(s), dmrs-Type = 1, maxLength = 2, rank = 5

| Value | Number of DMRS CDM group(s) without data | DMRS port(s) | Number of front-load symbols |
|---|---|---|---|
| 0 | 2 | 0-4 | 2 |
| 1-15 | Reserved | Reserved | Reserved |

TABLE 7

Antenna port(s), dmrs-Type = 1, maxLength = 2, rank = 6

| Value | Number of DMRS CDM group(s) without data | DMRS port(s) | Number of front-load symbols |
|---|---|---|---|
| 0 | 2 | 0, 1, 2, 3, 4, 5 | 2 |
| 1-15 | Reserved | Reserved | Reserved |

TABLE 8

Antenna port(s), dmrs-Type = 1, maxLength = 2, rank = 7

| Value | Number of DMRS CDM group(s) without data | DMRS port(s) | Number of front-load symbols |
|---|---|---|---|
| 0 | 2 | 0, 1, 2, 3, 4, 5, 6 | 2 |
| 1-15 | Reserved | Reserved | Reserved |

TABLE 9

Antenna port(s), dmrs-Type = 1, maxLength = 2, rank = 8

| Value | Number of DMRS CDM group(s) without data | DMRS port(s) | Number of front-load symbols |
|---|---|---|---|
| 0 | 2 | 0, 1, 2, 3, 4, 5, 6, 7 | 2 |
| 1-15 | Reserved | Reserved | Reserved |

Tables 10-15 show example indications of DMRS ports with DMRS Type-2 for different rank values in accordance with one or more embodiments of the present technology.

TABLE 10

Antenna port(s), dmrs-Type = 2, maxLength = 1, rank = 5

| Value | Number of DMRS CDM group(s) without data | DMRS port(s) |
|---|---|---|
| 0 | 3 | 0-4 |
| 1-15 | reserved | reserved |

TABLE 11

Antenna port(s), dmrs-Type = 2, maxLength = 1, rank = 6

| Value | Number of DMRS CDM group(s) without data | DMRS port(s) |
|---|---|---|
| 0 | 3 | 0-5 |
| 1-15 | Reserved | Reserved |

TABLE 12

Antenna port(s), dmrs-Type = 2, maxLength = 2, rank = 5

| Value | Number of DMRS CDM group(s) without data | DMRS port(s) | Number of front-load symbols |
|---|---|---|---|
| 0 | 2 | 0-4 | 2 |
| 1 | 2 | 0, 1, 2, 3, 6 | 2 |
| 12-15 | Reserved | Reserved | Reserved |

TABLE 13

Antenna port(s), dmrs-Type = 1, maxLength = 2, rank = 6

| Value | Number of DMRS CDM group(s) without data | DMRS port(s) | Number of front-load symbols |
|---|---|---|---|
| 0 | 2 | 0, 1, 2, 3, 4, 5 | 2 |
| 1 | 2 | 0, 1, 2, 3, 6, 8 | 2 |
| 2-15 | Reserved | Reserved | Reserved |

TABLE 14

Antenna port(s), dmrs-Type = 1, maxLength = 2, rank = 7

| Value | Number of DMRS CDM group(s) without data | DMRS port(s) | Number of front-load symbols |
|---|---|---|---|
| 0 | 2 | 0, 1, 2, 3, 6, 7, 8 | 2 |
| 1-15 | Reserved | Reserved | Reserved |

TABLE 15

Antenna port(s), dmrs-Type = 1, maxLength = 2, rank = 8

| Value | Number of DMRS CDM group(s) without data | DMRS port(s) | Number of front-load symbols |
|---|---|---|---|
| 0 | 2 | 0, 1, 2, 3, 6, 7, 8, 9 | 2 |
| 1-15 | Reserved | Reserved | Reserved |

More than four DMRS ports can be enabled by the configuration or indication of the UE. For example, if the UE is configured a frequency domain Orthogonal Cover Code (OCC) having a length of 4, the UE can be indicated with more than 4 DMRS ports. For a single-symbol DMRS, up to four DMRS ports can be supported in one Code Division Multiplexing (CDM) group. For a double-symbol DMRS, up to eight DMRS ports can be supported in one CDM group. If the DMRS ports are indicated in one CDM group, the PTRS is associated with at least one for the indicated DMRS ports in the CDM group. In some embodiments, DMRS ports from one CDM group can share up to one PTRS port.

In some embodiments, the UE is configured to map the DMRS to two REs on one PRB of one OFDM symbol. In this case, two REs can be used for one DMRS port mapping. Therefore, if one DMRS port is indicated to associated with one PTRS port, two REs can be used to map PTRS, and the PTRS can be mapped based on the following equation:

$$k = \left\{ \begin{array}{ll} 2n + 2k' + \Delta & DMRS \text{ Configuration type } 1 \\ 2n + k' + \Delta & DMRS \text{ Configuration type } 2 \end{array} \right\} \qquad \text{Eq. (1)}$$

Here, n=0, 1, . . . ; k'=0, 1 according to the DMRS port index, and Δ is associated with DMRS port index and CDM group index. The RE offset supports two values and can be shown Table 16.

TABLE 16

Example parameter $k_{ref}^{RE}$

| DM-RS antenna port $\tilde{p}$ | $k_{ref}^{RE}$ DM-RS Configuration type 1 resourceElementOffset offset 00 | offset 01 | offset 10 | offset 11 | DM-RS Configuration type 2 resourceElementOffset offset 00 | offset 01 | offset 10 | offset 11 |
|---|---|---|---|---|---|---|---|---|
| 0 | 0 | 2 | — | — | 0 | 1 | | |
| 1 | 2 | 0 | — | — | 1 | 0 | | |
| 2 | 1 | 3 | — | | 2 | 3 | | |
| 3 | 3 | 1 | — | | 3 | 2 | | |
| 4 | 4 | 6 | — | | 4 | 5 | | |
| 5 | 6 | 4 | — | | 5 | 4 | | |
| 6 | 7 | 9 | — | | 6 | 7 | | |
| 7 | 9 | 7 | — | | 7 | 6 | | |
| 8 | | | | | 8 | 9 | | |
| 9 | | | | | 9 | 8 | | |
| 10 | | | | | 10 | 11 | | |
| 11 | | | | | 11 | 10 | | |

Embodiment 4

Because one PTRS port can be shared by different numbers of DMRS ports and mapped on different REs of an OFDM symbol, different transmission energy levels can be adopted for transmission of PTRS and the related transmission on the Physical Uplink Shared Channel (PUSCH).

Table 17 shows example factors related to the PTRS power ratio per layer per RE. Considering the case of up to 2 PTRS ports are supported, the parameter $Q_p$ in Table 17 indicates the PTRS port number. For example, for full coherent UL transmissions with rank 8, all the 8 DMRS ports share one PTRS port, so the energy on each RE of the PTRS can 8 times to the each PUSCH transmission (e.g., 10×log(rank number), 9 dB). For non-codebook-based and/or non-coherent codebook-based UL transmissions, only one SRS port corresponds to one PTRS port. The power of other PUSCH transmissions cannot be used to enhance the transmission power of PTRS. Therefore, if only one PTRS port is used, the transmission energy is 0, and if two PTRS ports are used, the transmission power doubles for each PTRS port (e.g., 3 dB). For partial coherent transmissions with up to four DMRS ports sharing one PTRS port, the energy can be as high as four times to the power of a PUSCH transmission (e.g., 6 dB if one PTRS port is configured for full-coherent case). If two PTRS ports are used, the REs that the PTRS port 1 maps to cannot be used for PUSCH transmissions anymore, so the energy can be added on to PTRS port 0 and becomes 8 times to each PUSCH layer (e.g., $10\times\log(Q_{DMRS})+3\times Q_p-3$). Here, the $Q_{DMRS}$ is the DMRS port number that share one PTRS, and $Q_p$ is the PTRS port number. The energy becomes $3Q_p+3$ when either one or two PTRS ports are configured. In the case of partial coherent transmissions, the DMRS ports can be divided to subsets corresponding to PTRS ports. Ports in each subset are coherent but different subsets can have different numbers of ports. For example, for a 6-layer uplink transmission, the DMRS ports can be divided into two subsets each having 3 DMRS ports in each group. Alternatively, the DMRS ports can be divided into two subsets having two DMRS ports and four DMRS ports respectively. In some embodiments, to allow better power usage across the PTRS ports, power of different PTRS ports can be shared. For example, two DMRS ports share PTRS port 0 and four DRMS ports share PTRS port 1, leading to the power of PTRS port 0 being two times of PUSCH transmissions with one layer and the power of PTRS port 1 being four times of PUSCH transmission with one layer. To align the power usage the two cases, power can be shared across PTRS ports such that both PTRS ports use the same power level (e.g., based on six DMRS ports in total). That is, the power ratio of PTRS ports is associated with the total number of DMRS ports that share the PTRS ports. In some embodiments, the PTRS power can be restricted according to a rule so that the transmission power for each PTRS port is the same regardless of how many DMRS ports are associated with the PTRS port.

TABLE 17

Factor related to PUSCH to PT-RS power ratio per layer per RE
The number of PUSCH layers $(n_{layer}^{PUSCH})$

| 5 | | 6 | | 7 | | 8 | | |
|---|---|---|---|---|---|---|---|---|
| Full | Partial and non-coherent and non-coodbook | Full | Partial and non-coherent and non-codebook | Full | Partial and non-coherent and non-codebook | Full | Partial | Non-coherent and non-codebook |

TABLE 17-continued

Factor related to PUSCH to PT-RS power ratio per layer per RE
The number of PUSCH layers ($n_{layer}^{PUSCH}$)

| coherent | based | coherent | based | coherent | based | coherent | coherent | based |
|---|---|---|---|---|---|---|---|---|
| 6.99 | $3Q_p - 3$ | 7.78 | $3Q_p - 3$ | 8.45 | $3Q_p - 3$ | 9 | $3Q_p + 3$ | $3Q_p - 3$ |

| 1 | 2 | | 3 | | 4 | | |
|---|---|---|---|---|---|---|---|
| all cases | Full coherent | Partial and non-coherent and non-codebook based | Full coherent | Partial and non-coherent and non-codebook based | Full coherent | Partial coherent | Non-coherent and non-codebook based |
| 0 | 3 | $3Q_p - 3$ | 4.77 | $3Q_p - 3$ | 6 | $3Q_p$ | $3Q_p - 3$ |

For the partial coherent UL transmission, the power of the PTRS is associated with the codebook indicated by the TPMI or the coherent antenna port number associated with the PTRS port. For example, if two panels are supported for UL transmissions and there are four antenna ports in each panel, the PTRS power is associated with the DMRS port number in each panel if the antenna ports in each panel are coherent. For example, when one PTRS port is indicated, the power is determined as 10×log(rank number). When two SRS ports are shared by two DMRS ports (e.g., the TPMI indicates that the DMRS ports 0 and 1 are associated with SRS ports 0 and 2, and DMRS ports 2 and 3 are associated with SRS ports 1 and 3), it can be determined that each panel has partial coherency and the power of PTRS port is associated with the number of DMRS port sharing the same SRS port. For example, if up to 4 DMRS ports are transmitted on one panel and up to 2 PTRS are supported, the power of PTRS port(s) on each panel can be indicated according to the layer number (e.g., 1 to 4). If more PTRS ports are supported for up to 8 DMRS ports, the power of the other PTRS ports can also be used to enhance the power of the PTRS port(s).

In some embodiments, for non-coherent or non-codebook-based transmissions, the power of other PTRS port(s) can be used to enhance the power of current PTRS port. The power can be determined as 10×log(PTRS port number) for each PTRS. In some embodiments, the PTRS power can be used according to the total DMRS port number corresponding to all the PTRS ports (e.g., for panels that have full coherency).

In some embodiments, if the panel has partial coherency, the power of PTRS port can be 10×log(DMRS number). Here, the DMRS port number is the total number of DMRS ports that share the same SRS port(s) with each PTRS port respectively. For example, if two DMRS ports share SRS port 0 and 2 and the PTRS port 0 is also associated with these two SRS ports, then two DMRS ports are considered regardless of the actual DMRS ports that share the PTRS port. In some embodiments, when more than one PTRS ports are supported, there exists at least one PTRS port that is associated with numbers of DMRS ports. For example, two DMRS ports are associated with PTRS 1, The total PTRS power for each port is associated with the DMRS port(s) sharing the same SRS port(s) corresponding to the PTRS. If different number of DMRS ports share different PTRS ports (e.g., 2 DMRS ports share PTRS port 0 and 4 DMRS ports share PTRS port 1), the power of each PTRS port can be different without the power enhancement from other PTRS port(s). The power of PTRS port can thus be associated with the number of DMRS ports sharing the same SRS ports and the number of PTRS port(s). Alternatively, or in addition, the power of PTRS port can be associated with the total number of DMRS ports sharing the same SRS ports as this PTRS port and/or as other PTRS port(s).

Embodiment 5

In some embodiments, the four or more bits in the DCI signaling can form a single field (e.g., PTRS-DMRS association field). However, due to concerns for DCI signaling overhead and decoding complexity, in some embodiments, the four or more bits can be from multiple fields in the DCI signaling. In particular, reserved bit(s) or unused bits in other field in the DCI signaling can be used to indicate the PTRS-DMRS association.

As shown in Tables 6-15, when the transmission rank is greater than 2, some reserved bits exist in the DMRS port indication field in DCI. Selected bits in this field thus can be used to indicate the PTRS-DMRS association. For example, if more than 4 DMRS ports are configured (e.g., requiring more than 2 bits), the reserved bits are enabled to indicate the PTRS-DMRS association. In some embodiments, two bits in the PTRS-DMRS association field can be used to indicate the association of the first two PTRS ports and the related DMRS ports, and an additional two bits of the reserved bits in the DCI field can be used to indicate the association of the last two PTRS ports and the associated DMRS ports.

In some embodiments, only two PTRS are supported and each PTRS port is shared by up to 4 DMRS ports. The two bits in the PTRS-DMRS field are used to indicate the association of the DMRS ports and first PTRS port (PTRS port 0). Two bits of the reserved bits in the DCI field are used to indicate the association of DMRS ports and the second PTRS port (PTRS port 1). In some embodiments, the reserved bits can be considered as a second PTRS-DMRS association field that is used to indicate the association between DMRS and PTRS ports.

Embodiment 6

If two or more PTRS ports are supported, the PTRS can be mapped on the REs using OCC on the frequency domain. A frequency-domain OCC (FD-OCC) is used to multiplex DMRS ports together (e.g., into a pair of symbols).

Figure 6:
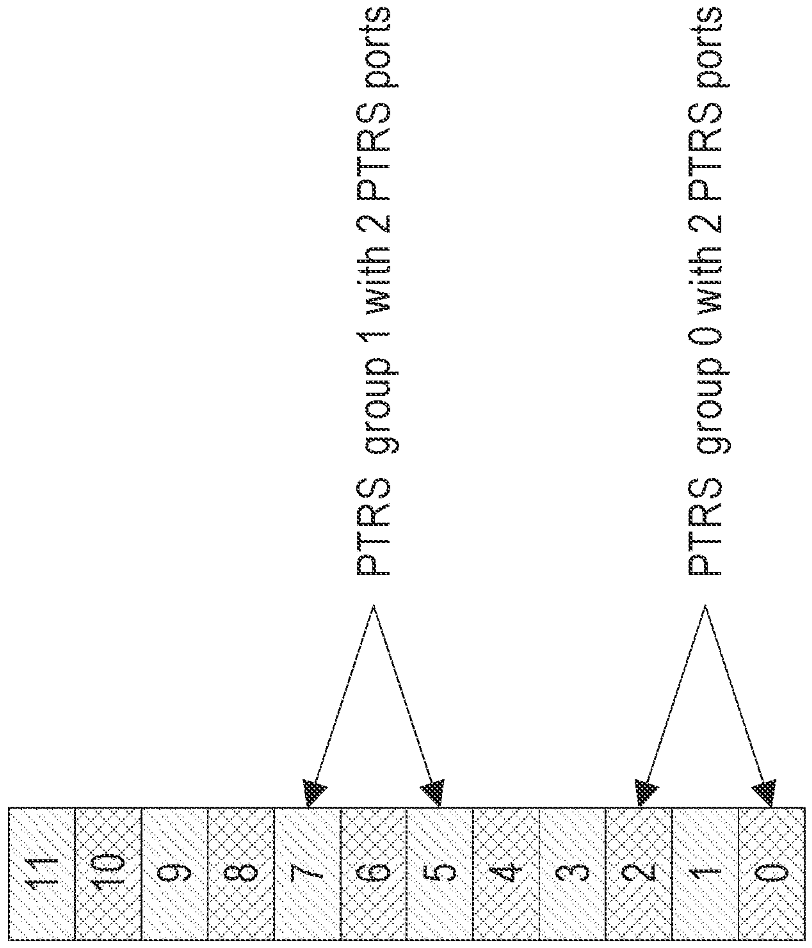
FIG. 6 illustrates an example of PTRS mapping in accordance with one or more embodiments of the present technology.

In some embodiments, four PTRS ports can be mapped on the REs using an OCC having a length of four, e.g. [1, 1, 1, 1], [1, 1, −1, −1], [1, −1, 1, −1], [1, −1, −1, 1]. In some embodiments, two PTRS ports can be mapped on the REs using an OCC having a length of two, e.g., [1,1] or [1,−1]. FIG. 6 illustrates an example 600 of PTRS mapping in accordance with one or more embodiments of the present technology. In this example, four PTRS ports are supported and are mapped on one PRB as shown in FIG. 6. PTRS port 0 and PTRS port 1 can be mapped on the two REs of the PRB as PTRS group 0, and PTRS port 2 and port 3 can be mapped on two REs of the PRB as PTRS group 1. In some embodiments, the PTRS ports in one CDM group can be determined by the index of the PTRS port (e.g., the lower indexes of the two PTRS port as PTRS port group 0 and the higher indexes of the two PTRS ports as PTRS port group 1). In some embodiments, the PTRS ports in one CDM group can be determined by the association of DMRS ports and PTRS ports. If the PTRS is associated with DMRS ports from one CDM group, the two PTRS ports can be mapped on the REs as one group. Each group of PTRS ports can be mapped on the combed REs on one OFDM symbol, such as the first group on RE #0,2 and the second group on REs #5,7 as shown in FIG. 6.

Embodiment 7

In some embodiments, the DMRS port is indicate based on the OCC length on the frequency domain. In particular, different types of OCC on the frequency domain can have a length of 2 or 4 (or other values). In the frequency domain, such as the scheduling of PRBs or a PRB group, different types of OCC can be used for one DMRS port.

For DMRS Type 1, one DMRS port is mapped to six REs in one PRB. If the FD-OCC has a length of four, six REs cannot be equally divided into four groups. Thus, PRB bundling for the scheduled PRB/PRB group/Bandwidth Part (BWP) can be used so that the same PMI can be applied to adjacent resource blocks to result in PMI/RI reporting using the same granularity. The bundling size can be an even number (e.g., 2, 4, etc.). The PRB can be bundled from the lowest PRB ID or the highest ID in each PRG or in the scheduled PRBs. When the PRB is bundled from the lowest PRB ID, the PRB having the highest ID or the last two REs of the CDM group in the highest PRB cannot be used for the mapping of DMRS ports with FD-OCC of length 4. Therefore, the DMRS ports can be mapped to the remaining PRB without PRB bundling using FD-OCC of length 2.

For DMRS port mapping with FD-OCC of length four, eight or twelve DMRS ports can be supported for single symbol DMRS, and 16 or 24 DMRS ports are supported for double symbol DMRS. If the DMRS port index smaller than 4 for single symbol DMRS or smaller than 4 for double symbol DMRS, the DMRS port can be used as a legacy DMRS port (e.g., with FD-OCC of length 2) in the PRBs without PRB bundling.

Some embodiments may preferably implement the following solutions. A set of preferred solutions may include the following (e.g., as described with reference to Embodiments 1-7).

1. A method for wireless communication, comprising transmitting, by a base station to a terminal device, a signaling message indicating an association between more than four Demodulation Reference Signal (DMRS) ports and at least two Phase Tracking Reference Signal (PTRS) ports, wherein the signaling message includes multiple groups of bits, wherein each group corresponds to a PTRS port, and wherein each group includes one or more bits indicating a value that corresponds to one of the more than four DMRS ports; and receiving, by the base station, a transmission from the terminal device according to the signaling message.
2. A method for wireless communication, comprising: receiving, by a terminal device from a base station, a signaling message indicating an association between more than four Demodulation Reference Signal (DMRS) ports and at least two Phase Tracking Reference Signal (PTRS) ports, wherein the signaling message includes multiple groups of bits, wherein each group corresponds to a PTRS port, and wherein each group includes one or more bits indicating a value that corresponds to one of the more than four DMRS ports; and performing, by the terminal device, a transmission to the base station according to the signaling message.
3. The method of solution 1 or 2, wherein the signaling message include two groups of bits, and each group include at least one of: two bits that indicate the association between one PTRS port and one DMRS port from up to 4 DMRS ports that share the one PTRS port; or one bit that indicates the association between one PTRS port and one DMRS port from first two DMRS ports that share the one PTRS port.
4. The method of any of solutions 1 to 3, wherein the signaling message include four groups of bits, and each group include 1 bit to indicate the association between one PTRS port and one DMRS port from up to two DMRS ports that share the one PTRS port.
5. The method of any of solutions 1 to 4, wherein the signaling message is indicated for a transmission from the terminal device to the base station, the transmission comprising at least one of: a partial coherent codebook based transmission, a non-coherent codebook-based transmission, or a non-codebook-based transmission.
6. A method for wireless communication, comprising: transmitting, by a base station to a terminal device, a signaling message that includes at least three bits indicating an association between more than four Demodulation Reference Signal (DMRS) ports and a single Phase Tracking Reference Signal (PTRS) port; and receiving, by the base station, a transmission from the terminal device according to the signaling message.
7. A method for wireless communication, comprising receiving, by a terminal device from a base station, a signaling message that includes at least three bits indicating an association between more than four Demodulation Reference Signal (DMRS) ports and a single Phase Tracking Reference Signal (PTRS) port; and performing, by the terminal device, a transmission to the base station according to the signaling message.
8. The method of solution 6 or 7, wherein the signaling message is for a transmission from the terminal device to the base station, the transmission comprising at least one of a full coherent codebook-based transmission.
9. The method of any of solutions 1 to 8, wherein the association is indicated using a total number of four bits in the signaling message.
10. The method of any of solutions 1 to 8, wherein the association is indicated using a total number of N bits in the signaling message, wherein N is at least one of: four bits for a partial coherent, a non-coherent codebook-based uplink transmission, or a non-codebook-based uplink transmission, or three bits for a full coherent codebook-based uplink transmission.

11. The method of any of solutions 1 to 10, wherein one PTRS port is associated with at least one other PTRS port with a Code Division Multiplexing (CDM) in a frequency domain.
12. The method of solution 11, wherein the DMRS ports are organized into one or more CDM groups, and wherein an orthogonal cover code (OCC) in each CDM group includes at least one of: [1,1], [1,−1], [1, 1, 1, 1], [1, 1, −1, −1], [1, −1, 1, −1], or [1, −1, −1, 1].
13. The method of any of solutions 1 to 12, wherein the signaling message is a Downlink Control Information (DCI) message, and wherein part of the bits is represented using reserved bits in the DCI message.
14. The method of any of solutions 1 to 13, wherein DMRS ports in a same Code Division Multiplexing (CDM) group share at most one PTRS port.
15. The method of any of solutions 1 to 14, wherein resource elements that a PTRS maps to are determined based on the association between the more than four DMRS ports and the at least two PTRS ports.
16. The method of solution 15, wherein the resource elements are mapped according to $$k = \begin{Bmatrix} 2n + 2k' + \Delta & DMRS\text{ Configuration type 1} \\ 2n + k' + \Delta & DMRS\text{ Configuration type 2} \end{Bmatrix},$$

wherein n is a non-negative integer, k' is equal to 0 or 1 according to a DMRS port index, A is associated with the DMRS port index and a Code Division Multiplexing (CMD) group index.

17. The method of solution 15, wherein resource elements to which the PTRS maps are determined based on a parameter $$k_{ref}^{RE}$$

defined according to:

| DM-RS antenna port $\tilde{p}$ | $k_{ref}^{RE}$ DM-RS Configuration type 1 resource ElementOffset: offset 00 | offset 01 | offset 10 | offset 11 | DM-RS Configuration type 2 resourceElementOffset: offset 00 | offset 01 | offset 10 | offset 11 |
|---|---|---|---|---|---|---|---|---|
| 0 | 0 | 2 | 4 | 6 | 0 | 1 | 6 | 7 |
| 1 | 2 | 4 | 6 | 0 | 1 | 6 | 7 | 0 |
| 2 | 1 | 3 | 5 | 7 | 2 | 3 | 8 | 9 |
| 3 | 3 | 5 | 7 | 1 | 3 | 8 | 9 | 2 |
| 4 | 4 | 6 | 0 | 2 | 4 | 5 | 10 | 11 |
| 5 | 6 | 0 | 2 | 4 | 5 | 10 | 11 | 4 |
| 6 | 5 | 7 | 1 | 3 | 6 | 7 | 1 | 0 |
| 7 | 7 | 1 | 3 | 5 | 7 | 1 | 0 | 6 |
| 8 | | | | | 8 | 9 | 2 | 3 |
| 9 | | | | | 9 | 2 | 3 | 8 |
| 10 | | | | | 10 | 11 | 4 | 5 |
| 11 | | | | | 11 | 4 | 5 | 10. |

18. The method of solution 15, wherein subcarriers to which the PTRS maps are determined based on a parameter $$k_{ref}^{RE}$$

defined according to:

| DM-RS antenna port $\tilde{p}$ | $k_{ref}^{RE}$ DM-RS Configuration type 1 resource ElementOffset: offset 00 | offset 01 | offset 10 | offset 11 | DM-RS Configuration type 2 resourceElementOffset: offset 00 | offset 01 | offset 10 | offset 11 |
|---|---|---|---|---|---|---|---|---|
| 0 | 0 | 2 | — | — | 0 | 1 | — | — |
| 1 | 2 | 0 | — | — | 1 | 0 | — | — |
| 2 | 1 | 3 | — | — | 2 | 3 | — | — |
| 3 | 3 | 1 | — | — | 3 | 2 | — | — |
| 4 | 4 | 6 | — | — | 4 | 5 | — | — |
| 5 | 6 | 4 | — | — | 5 | 4 | — | — |
| 6 | 7 | 9 | — | — | 6 | 7 | — | — |
| 7 | 9 | 7 | — | — | 7 | 6 | — | — |
| 8 | | | | | 8 | 9 | — | — |
| 9 | | | | | 9 | 8 | — | — |
| 10 | | | | | 10 | 11 | — | — |
| 11 | | | | | 11 | 10 | — | —. |

19. The method of any of solutions 1 to 18, wherein a power ratio per layer per resource element for the PTRS is determined based on at least one of: a number of DMRS ports that share one PTRS port, a number of PTRS ports, or a number of PTRS ports that shares a same antenna port for a data transmission from the terminal device to the base station.
20. The method of solution 19, wherein the power ratio is determined according to a rule, wherein the rule is associated with a coherent type of each transmission group of DMRS ports that share the PTRS port, wherein the rule comprises at least one of:

1) wherein the power ratio for a non-coherent or non-codebook-based transmission is determined as 10×log(a number of PTRS ports);

(2) wherein the power ratio for a full coherent transmission is determined according to a total number of DMRS ports corresponding to all PTRS ports, the power ratio represented as 10×log(DMRS port number);

(3) wherein the power ratio is determined according to $10\times\log(Q_{DMRS})+3*Q_p-3$, wherein $Q_{DMRS}$ represents a number of DMRS ports that share one PTRS port, and wherein a PTRS port number is represented as Qp;

(4) wherein the power ratio is determined according to $10\times\log(Q_{DMRS})$, wherein $Q_{DMRS}$ represents a total number of counted DMRS ports, wherein the counted DMRS ports in each group share a same SRS port with an associated PTRS port.

21. The method of solution 19, wherein the PTRS port number is represented as Qp, and wherein the power ratio is defined as:

| The number of PUSCH layers ($n_{layer}^{PUSCH}$) | | | | | | | | |
|---|---|---|---|---|---|---|---|---|
| 5 | | 6 | | 7 | | 8 | | |
| Full coherent | Partial and non-coherent and non-coodbook based | Full coherent | Partial and non-coherent and non-codebook based | Full coherent | Partial and non-coherent and non-codebook based | Full coherent | Partial coherent | Non-coherent and non-codebook based |
| 6.99 | $3Q_p - 3$ | 7.78 | $3Q_p - 3$ | 8.45 | $3Q_p - 3$ | 9 | $3Q_p + 3$ | $3Q_p - 3$. |

22. The method of solution 19, wherein the PTRS port number is represented as Qp, and wherein the power ratio is defined as:

| The number of PUSCH layers ($n_{layer}^{PUSCH}$) | | | | | | | | |
|---|---|---|---|---|---|---|---|---|
| 5 | | 6 | | 7 | | 8 | | |
| Full coherent | Partial and non-coherent and non-coodbook based | Full coherent | Partial and non-coherent and non-codebook based | Full coherent | Partial and non-coherent and non-codebook based | Full coherent | Partial coherent | Non-coherent and non-codebook based |
| 6.99 | $3Q_p - 3$ | 7.78 | $3Q_p - 3$ | 8.45 | $3Q_p - 3$ | 9 | $3Q_p$ | $3Q_p - 3$. |

23. The method of any of solutions 1 to 22, the signaling message include at least one of four bits in a PTRS-DMRS association field; or two bits in the PTRS-DMRS association field and two bits in a reserved field or in an antenna port indication field.

24. The method of any of solutions 1 to 23, wherein more than 4 DMRS ports from total up to 24 DMRS ports are indicated in the signaling message.

25. The method of any of solutions 1 to 24, wherein the DMRS ports are configured for a DMRS sequence in a single symbol.

26. A communication apparatus, comprising a processor configured to implement a method recited in any one or more of solutions 1 to 25.

27. A computer program product having code stored thereon, the code, when executed by a processor, causing the processor to implement a method recited in any one or more of solutions 1 to 25.

Figure 7:
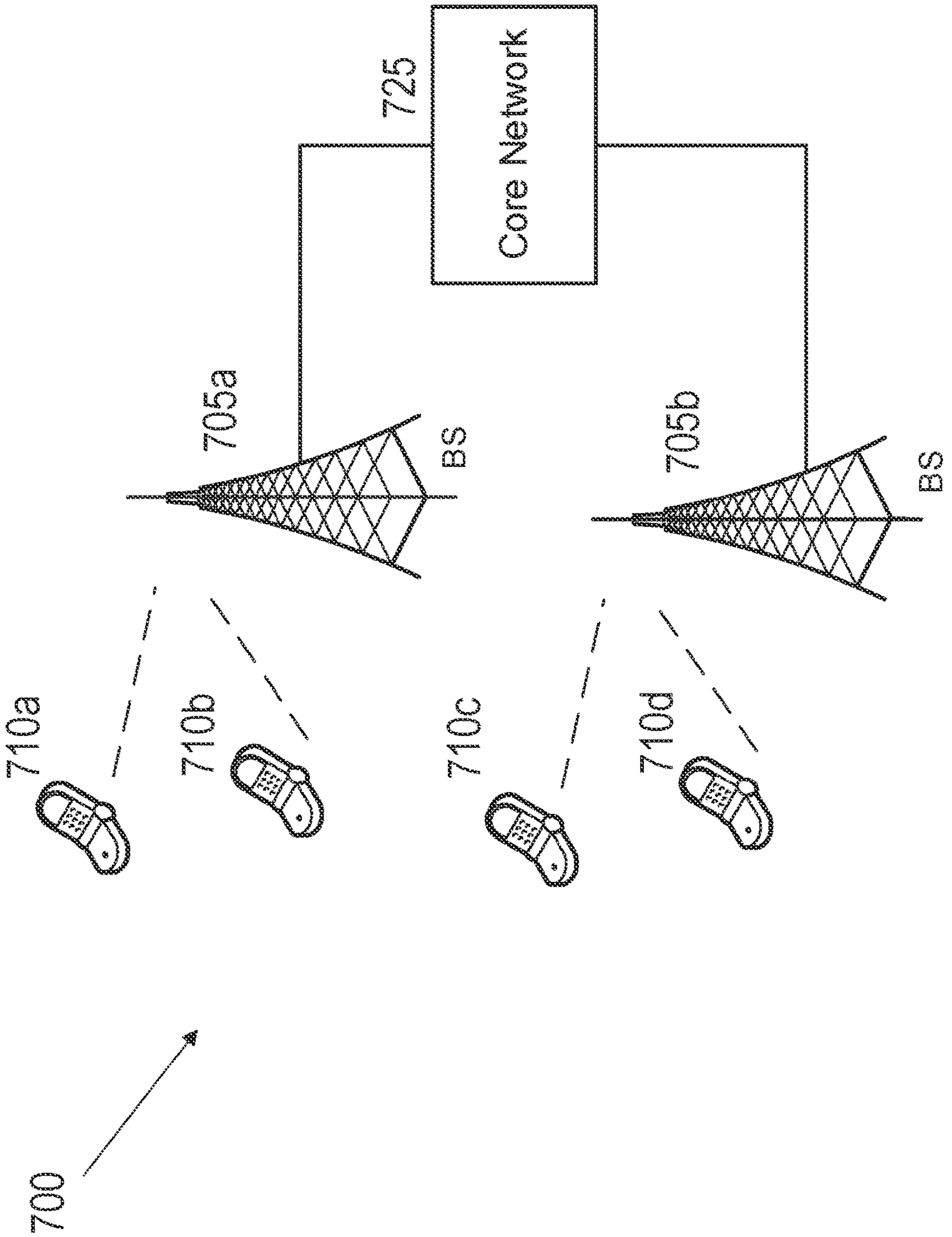
FIG. 7 shows an example of a wireless communication system where techniques in accordance with one or more embodiments of the present technology can be applied.

FIG. 7 shows an example of a wireless communication system 700 where techniques in accordance with one or more embodiments of the present technology can be applied. A wireless communication system 700 can include one or more base stations (BSs) 705*a*, 705*b*, one or more wireless devices (or UEs) 710*a*, 710*b*, 710*c*, 710*d*, and a core network 725. A base station 705*a*, 705*b* can provide wireless service to user devices 710*a*, 710*b*, 710*c* and 710*d* in one or more wireless sectors. In some implementations, a base station 705*a*, 705*b* includes directional antennas to produce two or more directional beams to provide wireless coverage in different sectors. The core network 725 can communicate with one or more base stations 705*a*, 705*b*. The core network 725 provides connectivity with other wireless communication systems and wired communication systems. The core network may include one or more service subscription databases to store information related to the subscribed user devices 710*a*, 710*b*, 710*c*, and 710*d*. A first base station 705*a* can provide wireless service based on a first radio access technology, whereas a second base station 705*b* can provide wireless service based on a second radio access technology. The base stations 705*a* and 705*b* may be co-located or may be separately installed in the field according to the deployment scenario. The user devices 710*a*, 710*b*, 710*c*, and 710*d* can support multiple different radio access technologies. The techniques and embodiments described in the present document may be implemented by the base stations of wireless devices described in the present document.

Figure 8:
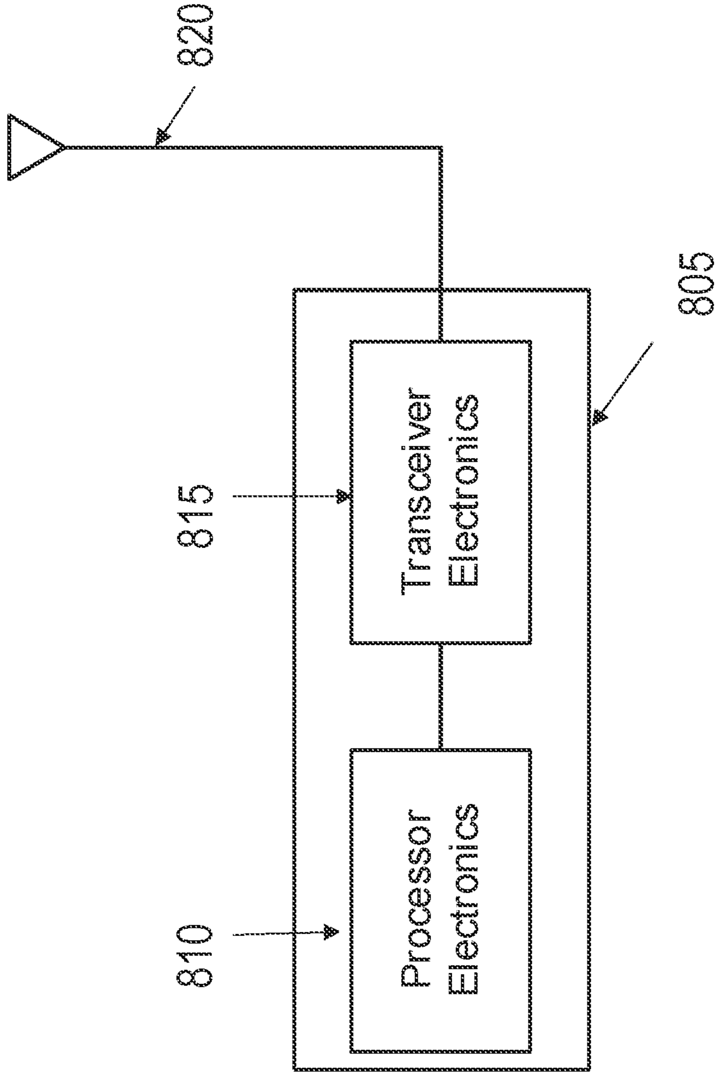
FIG. 8 is a block diagram representation of a portion of a radio station in accordance with one or more embodiments of the present technology can be applied.

FIG. 8 is a block diagram representation of a portion of a radio station in accordance with one or more embodiments of the present technology can be applied. A radio station 805 such as a network node, a base station, or a wireless device (or a user device, UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805. In some embodiments, the radio station 805 may be configured to perform the methods described herein.

It will be appreciated that the present document discloses techniques that can be embodied in various embodiments to facilitate the efficient scheduling of the split transmission scheme in which the base station performs full-duplex transmissions and the UE performs half-duplex transmissions for TDD systems. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:

transmitting, by a base station to a terminal device, a Downlink Control Information (DCI) signaling message, wherein the DCI signaling message comprises four bits indicating an association between eight Demodulation Reference Signal (DMRS) ports and two or more Phase Tracking Reference Signal (PTRS) ports for a partial coherent or non-coherent codebook-based transmission, wherein the four bits include two groups of bits, wherein each group corresponds to a PTRS port and a respective subset of up to four DMRS ports, and wherein each group includes two bits indicating a value that corresponds to the respective subset of up to four DMRS ports that share the PTRS port, wherein the respective subset of up to four DMRS ports corresponding to a given PTRS port corresponds to a frequency-domain orthogonal cover code (FD-OCC) that (i) has a length of four and (ii) is applied across a plurality of physical resource blocks (PRBs) bundled together where each of the up to four DMRS ports maps to six resource elements (REs) in each of the bundled PRBs, wherein a first group of two bits having a value of 0 indicates that a first DMRS port of a first subset of DMRS ports is associated with PTRS port 0, wherein the first group of two bits having a value of 1 indicates that a second DMRS port of the first subset of DMRS ports is associated with PTRS port 0, wherein the first group of two bits having a value of 2 indicates that a third DMRS port of the first subset of DMRS ports is associated with PTRS port 0, wherein the first group of two bits having a value of 3 indicates that a fourth DMRS port of the first subset of DMRS ports is associated with PTRS port 0, wherein a second group of two bits having a value of 0 indicates that a first DMRS port of a second subset of DMRS ports is associated with PTRS port 1, wherein the second group of two bits having a value of 1 indicates that a second DMRS port of the second subset of DMRS ports is associated with PTRS port 1, wherein the second group of two bits having a value of 2 indicates that a third DMRS port of a second subset of DMRS ports is associated with PTRS port 1, and wherein the second group of two bits having a value of 3 indicates that a fourth DMRS port of a second subset of DMRS ports is associated with PTRS port 1; and receiving, by the base station, the partial coherent or non-coherent codebook-based transmission from the terminal device according to the DCI signaling message.

2. The method of claim 1, wherein the first subset of DMRS ports shares coherent SRS ports {0, 4, 1, 5} and shares PTRS port 0, and wherein the second subset of DMRS ports shares coherent SRS ports {2, 6, 3, 7} and shares PTRS port 1.

3. The method of claim 1, wherein a power ratio per layer per resource element for the PTRS for a Physical Uplink Shared Channel (PUSCH) is determined according to a rule, wherein the rule is associated with a coherent type of each transmission group of DMRS ports that share the PTRS port, wherein the rule specifies that the power ratio for a non-coherent or non-codebook based transmission is determined as 10×log(Qp), and wherein Qp represents a number of PTRS ports.

4. The method of claim 1, wherein a power ratio per layer per resource element for the PTRS for a Physical Uplink Shared Channel (PUSCH) is determined according to $10\times\log(Q_{DMRS})+3*Q_p-3$, and wherein $Q_{DMRS}$ represents a number of DMRS ports that share one PTRS port, and wherein Qp represents a number of PTRS ports.

5. A method for wireless communication, comprising:

receiving, by a terminal device from a base station, a Downlink Control Information (DCI) signaling message, wherein the DCI signaling message comprises four bits indicating an association between eight Demodulation Reference Signal (DMRS) ports and two or more Phase Tracking Reference Signal (PTRS) ports for a partial coherent or non-coherent codebook-based transmission, wherein the four bits include two groups of bits, wherein each group corresponds to a PTRS port and a respective subset of four DMRS ports, and wherein each group includes two bits indicating a value that corresponds to the respective subset of four DMRS ports that share the PTRS port, wherein the respective subset of four DMRS ports corresponding to a given PTRS ports corresponds to a frequency-domain orthogonal cover code (FD-OCC) that (i) has a length of four and (ii) is applied across a plurality of physical resource blocks (PRBs) bundled together where each of the up to four DMRS ports maps to six resource elements (REs) in each of the bundled PRBs, wherein a first group of two bits having a value of 0 indicates that a first DMRS port of a first subset of DMRS ports is associated with PTRS port 0, wherein the first group of two bits having a value of 1 indicates that a second DMRS port of the first subset of DMRS ports is associated with PTRS port 0, wherein the first group of two bits having a value of 2 indicates that a third DMRS port of the first subset of DMRS ports is associated with PTRS port 0, wherein the first group of two bits having a value of 3 indicates that a fourth DMRS port of the first subset of DMRS ports is associated with PTRS port 0, wherein a second group of two bits having a value of 0 indicates that a first DMRS port of a second subset of DMRS ports is associated with PTRS port 1, wherein the second group of two bits having a value of 1 indicates that a second DMRS port of the second subset of DMRS ports is associated with PTRS port 1, wherein the second group of two bits having a value of 2 indicates that a third DMRS port of the second subset of DMRS ports is associated with PTRS port 1, and wherein the second group of two bits having a value of 3 indicates that a fourth DMRS port of the second subset of DMRS ports is associated with PTRS port 1; and performing, by the terminal device, the partial coherent or non-coherent codebook-based transmission to the base station according to the DCI signaling message.

6. The method of claim 5, wherein the first subset of DMRS ports shares coherent SRS ports {0, 4, 1, 5} and shares PTRS port 0, and wherein the second subset of DMRS ports shares coherent SRS ports {2, 6, 3, 7} and shares PTRS port 1.

7. The method of claim 5, wherein a power ratio per layer per resource element for the PTRS for a Physical Uplink Shared Channel (PUSCH) is determined according to a rule, wherein the rule is associated with a coherent type of each transmission group of DMRS ports that share the PTRS port, wherein the rule specifies that the power ratio for a non-coherent or non-codebook based transmission is determined as 10×log(Qp), and wherein Qp represents a number of PTRS ports.

8. The method of claim 5, wherein a power ratio per layer per resource element for the PTRS for a Physical Uplink Shared Channel (PUSCH) is determined according to $10\times\log(Q_{DMRS})+3*Q_p-3$, and wherein $Q_{DMRS}$ represents a number of DMRS ports that share one PTRS port, and wherein Qp represents a number of PTRS ports.

9. A communication apparatus, comprising at least one processor configured to:

transmit, to a terminal device, a Downlink Control Information (DCI) signaling message, wherein the DCI signaling message comprises four bits indicating an association between eight Demodulation Reference Signal (DMRS) ports and two or more Phase Tracking Reference Signal (PTRS) ports for a partial coherent or non-coherent codebook-based transmission, wherein the four bits include two groups of bits, wherein each group corresponds to a PTRS port and a respective subset of four DMRS ports, and wherein each group includes two bits indicating a value that corresponds to the respective subset of four DMRS ports that share the PTRS port, wherein the respective subset of four DMRS ports corresponding to a given PTRS ports corresponds to a frequency-domain orthogonal cover code (FD-OCC) that (i) has a length of four and (ii) is applied across a plurality of physical resource blocks (PRBs) bundled together where each of the up to four DMRS ports maps to six resource elements (REs) in each of the bundled PRBs, wherein a first group of two bits having a value of 0 indicates that a first DMRS port of a first subset of DMRS ports is associated with PTRS port 0, wherein the first group of two bits having a value of 1 indicates that a second DMRS port of the first subset of DMRS ports is associated with PTRS port 0, wherein the first group of two bits having a value of 2 indicates that a third DMRS port of the first subset of DMRS ports is associated with PTRS port 0, wherein the first group of two bits having a value of 3 indicates that a fourth DMRS port of the first subset of DMRS ports is associated with PTRS port 0, wherein a second group of two bits having a value of 0 indicates that a first DMRS port of a second subset of DMRS ports is associated with PTRS port 1, wherein the second group of two bits having a value of 1 indicates that a second DMRS port of the second subset of DMRS ports is associated with PTRS port 1, wherein the second group of two bits having a value of 2 indicates that a third DMRS port of the second subset of DMRS ports is associated with PTRS port 1, and wherein the second group of two bits having a value of 3 indicates that a fourth DMRS port of the second subset of DMRS ports is associated with PTRS port 1; and receive the partial coherent or non-coherent codebook-based transmission from the terminal device according to the DCI signaling message.

10. The communication apparatus of claim 9, wherein the first subset of DMRS ports shares coherent SRS ports {0, 4, 1, 5} and shares PTRS port 0, and wherein the second subset of DMRS ports shares coherent SRS ports {2, 6, 3, 7} and shares PTRS port 1.

11. The communication apparatus of claim 9, wherein a power ratio per layer per resource element for the PTRS for a Physical Uplink Shared Channel (PUSCH) is determined according to a rule, wherein the rule is associated with a coherent type of each transmission group of DMRS ports that share the PTRS port, wherein the rule specifies that the power ratio for a non-coherent or non-codebook based transmission is determined as 10×log(Qp), and wherein Qp represents a number of PTRS ports.

12. The communication apparatus of claim 9, wherein a power ratio per layer per resource element for the PTRS for a Physical Uplink Shared Channel (PUSCH) is determined according to $10\times\log(Q_{DMRS})+3*Q_p-3$, and wherein $Q_{DMRS}$ represents a number of DMRS ports that share one PTRS port, and wherein Qp represents a number of PTRS ports.

13. A communication apparatus, comprising at least one processor configured to:

receive, from a base station, a Downlink Control Information (DCI) signaling message, wherein the signaling message comprises four bits indicating an association between eight Demodulation Reference Signal (DMRS) ports and two or more Phase Tracking Reference Signal (PTRS) ports for a partial coherent or non-coherent codebook-based transmission, wherein the four bits include two groups of bits, wherein each group corresponds to a PTRS port and a respective subset of four DMRS ports, and wherein each group includes two bits indicating a value that corresponds to the respective subset of four DMRS ports that share the PTRS port, wherein the respective subset of four DMRS ports corresponding to a given PTRS ports corresponds to a frequency-domain orthogonal cover code (FD-OCC) that (i) has a length of four and (ii) is applied across a plurality of physical resource blocks (PRBs) bundled together where each of the up to four DMRS ports maps to six resource elements (REs) in each of the bundled PRBs, wherein a first group of two bits having a value of 0 indicates that a first DMRS port of a first subset of DMRS ports is associated with PTRS port 0, wherein the first group of two bits having a value of 1 indicates that a second DMRS port of the first subset of DMRS ports is associated with PTRS port 0, wherein the first group of two bits having a value of 2 indicates that a third DMRS port of the first subset of DMRS ports is associated with PTRS port 0, wherein the first group of two bits having a value of 3 indicates that a fourth DMRS port of the first subset of DMRS ports is associated with PTRS port 0, wherein a second group of two bits having a value of 0 indicates that a first DMRS port of a second subset of DMRS ports is associated with PTRS port 1, wherein the second group of two bits having a value of 1 indicates that a second DMRS port of the second subset of DMRS ports is associated with PTRS port 1, wherein the second group of two bits having a value of 2 indicates that a third DMRS port of the second subset of DMRS ports is associated with PTRS port 1, and wherein the second group of two bits having a value of 3 indicates that a fourth DMRS port of the second subset of DMRS ports is associated with PTRS port 1; and perform the partial coherent or non-coherent codebook-based transmission to the base station according to the DCI signaling message.

14. The communication apparatus of claim 13, wherein the first subset of DMRS ports shares coherent SRS ports {0, 4, 1, 5} and shares PTRS port 0, and wherein the second subset of DMRS ports shares coherent SRS ports {2, 6, 3, 7} and shares PTRS port 1.

15. The communication apparatus of claim 13, wherein a power ratio per layer per resource element for the PTRS for a Physical Uplink Shared Channel (PUSCH) is determined according to a rule, wherein the rule is associated with a coherent type of each transmission group of DMRS ports that share the PTRS port, wherein the rule specifies that the power ratio for a non-coherent or non-codebook based transmission is determined as 10×log(Qp), and wherein Qp represents a number of PTRS ports.

16. The communication apparatus of claim 13, wherein a power ratio per layer per resource element for the PTRS for a Physical Uplink Shared Channel (PUSCH) is determined according to $10\times\log(Q_{DMRS})+3*Q_p-3$, and wherein $Q_{DMRS}$ represents a number of DMRS ports that share one PTRS port, and wherein Qp represents a number of PTRS ports.

* * * * *